US012766795B2

(12) United States Patent
Yamazaki

(10) Patent No.: US 12,766,795 B2
(45) Date of Patent: Oct. 20, 2026

(54) HEAT SEAL BAR ATTACHMENT DEVICE

(71) Applicant: Totani Corporation, Kyoto (JP)

(72) Inventor: Ryota Yamazaki, Kyoto (JP)

(73) Assignee: Totani Corporation, Kyoto (JP)

( * ) Notice: Subject to any disclaimer, the term of this patent is extended or adjusted under 35 U.S.C. 154(b) by 193 days.

(21) Appl. No.: 18/682,309

(22) PCT Filed: Sep. 29, 2022

(86) PCT No.: PCT/JP2022/036536

§ 371 (c)(1),
(2) Date: Feb. 8, 2024

(87) PCT Pub. No.: WO2023/095437

PCT Pub. Date: Jun. 1, 2023

(65) Prior Publication Data

US 2025/0128476 A1 Apr. 24, 2025

(30) Foreign Application Priority Data

Nov. 26, 2021 (JP) ................................ 2021-191747

(51) Int. Cl.
*B29C 65/78* (2006.01)
*B29C 65/00* (2006.01)
*B29C 65/20* (2006.01)

(52) U.S. Cl.
CPC .......... *B29C 65/7841* (2013.01); *B29C 65/20* (2013.01); *B29C 66/43121* (2013.01); *B29C 66/9221* (2013.01)

(58) Field of Classification Search
CPC ................ B29C 65/7841; B29C 65/20; B29C 66/43121; B29C 66/9221; B29C 66/8122; B32B 38/004; B32B 37/06; B32B 37/20; B32B 37/203; B65B 51/30; B65B 51/303; B65B 51/306
See application file for complete search history.

(56) References Cited

U.S. PATENT DOCUMENTS 5,377,474 A * 1/1995 Kovacs .................. B65B 9/213 53/64
9,205,597 B2 12/2015 Totani et al.
2004/0256373 A1* 12/2004 Irwin .................. B29C 66/8122 219/243
2013/0059710 A1* 3/2013 Totani .................... B29C 65/18 493/189
2018/0057198 A1* 3/2018 Anderson .............. B29C 65/18

FOREIGN PATENT DOCUMENTS

JP 5058367 B1 8/2012

* cited by examiner

*Primary Examiner* — George R Koch
(74) *Attorney, Agent, or Firm* — NovoTechIP International PLLC

(57) ABSTRACT

A heat seal bar attachment device for a bag making apparatus is used to detachably attach a heat seal bar to a heater. A rod with an attachment head is inserted through the heater. A support supports the heater. A slider is accommodated in a guide recess of the support to be slidable together with the rod, and receives one end of the rod. A biasing member is disposed between the heater and the slider to bias the slider towards a bottom surface of the guide recess. A fluid supply unit is configured to supply fluid to the guide recess and stop supplying the fluid. The fluid supply unit is configured to supply the fluid to the guide recess to slide the slider together with the rod against the biasing member.

11 Claims, 9 Drawing Sheets

HEAT SEAL BAR ATTACHMENT DEVICE

TECHNICAL FIELD

The present disclosure relates to a heat seal bar attachment device for use in a bag making apparatus, and in particular, to detachable attachment of a heat seal bar to a heater.

BACKGROUND

A bag making apparatus heat-seals components of bags, such as sheet panels and gussets in order to make the bags. The bag making apparatus, for example, sandwiches the components between a pair of heat seal bars to heat-seal the components. At least one of the heat seal bars is attached to a heater and heated by the heater during heat sealing.

The bag making apparatus typically heat-seals the components such that the resulting bag has a sealed section along its periphery. Therefore, when the same bag making apparatus is used to make bags with a different design, the heat seal bar(s) may need to be changed to one(s) with a different shape. For this purpose, the bag making apparatus includes a heat seal bar attachment device. The heat seal bar attachment device allows an operator to replace heat seal bars by detaching a heat seal bar from a heater and attaching another heat seal bar to the heater.

Patent document 1 discloses a heat seal bar attachment device. This attachment device includes a rod (tension pin) inserted through a heater and an insert inserted in a heat seal bar. The rod has an attachment head at its tip. The attachment head and the insert each have a special shape so that the attachment head can be detachably received by the insert.

In attaching or detaching a heat seal bar, it is necessary to move the rod in its longitudinal direction with respect to the heater to advance or retract the attachment head, which is located at the tip of the rod. The attachment device in Patent document 1 further includes an operation mechanism to be operated by a user for moving the rod. The operation mechanism is a toggle mechanism, a fluid cylinder (air or hydraulic), a servo motor, a direct-acting solenoid valve, or the like. The attachment device in Patent document 1 eliminates the need for bolting to attach the heat seal bar to the heater.

The present disclosure provides a heat seal bar attachment device for moving a rod with an attachment head in its longitudinal direction with respect to a heater by means of a novel configuration.

SUMMARY

According to one aspect of the present disclosure, there is provided a heat seal bar attachment device for use in a bag making apparatus and for detachably attaching a heat seal bar to a heater, the heat seal bar attachment device comprising: a rod inserted through the heater and having an attachment head at a first end thereof, the attachment head being configured to be detachably attached to an insert fitted into a heat seal bar; a support for supporting the heater, the support having a guide recess facing the heater; a slider having a receiving recess for receiving a second end of the rod, the slider being received in the guide recess to be slidable together with the rod towards and away from the heater; a biasing member disposed between the heater and the slider to bias the slider towards a bottom surface of the guide recess; and a fluid supply unit configured to supply fluid to the guide recess and stop supplying the fluid, wherein the fluid supply unit is configured to supply the fluid to the guide recess to slide the slider together with the rod against the biasing member towards the heater.

The rod may have a protrusion at the second end, the protrusion extending in a radial direction of the rod. The slider may comprise a stopper at an opening of the receiving recess. The heat seal bar attachment device may further comprise an additional biasing member disposed in the receiving recess to bias the protrusion for engaging the protrusion with the stopper.

The protrusion may be flange-shaped and have a convex spherical surface. The stopper may be annular-shaped and have a concave spherical surface complementary to the convex spherical surface. The convex spherical surface and the concave spherical surface may be in surface contact with each other when the protrusion is engaged with the stopper by the additional basing member.

The biasing member and the additional biasing member may be springs.

A flow channel hole may be formed in the support to be in communication with the guide recess at the bottom surface of the guide recess. The fluid supply unit may be configured to supply the fluid to the guide recess through the flow channel hole.

The fluid supply unit may comprise: a tube connected to the flow channel hole; and a fluid supplier connected to the tube to supply the fluid to the guide recess through the tube and the flow channel hole.

The fluid supplier may be an air cylinder configured to supply air as the fluid.

The heat seal bar attachment device may further comprise a user interface. The fluid supply unit may be configured to switch supply of the fluid and stop of the supply in response to an input through the user interface.

The heat seal bar attachment device may be configured to bring the heat seal bar into close contact with a first surface of the heater when the heat seal bar is attached to the heater. The heater may have an injection hole as a through hole extending between the first surface and a second surface different from the first surface. The heat seal bar attachment device may further comprise: a tubular member defining a flow channel which is in communication with the injection hole at the second surface; an air injector configured to inject air through the flow channel into the injection hole; a pressure sensor for detecting air pressure in the flow channel; and a determination part configured to determine whether or not the heat seal bar is in close contact with the first surface based on the air pressure measured by the pressure sensor.

The determination part may be configured to determine: that the heat seal bar is in close contact with the heater, when the pressure sensor detects air pressure exceeding a threshold value during injection of the air into the injection hole; and that the heat seal bar is not in close contact with the heater, when the pressure sensor does not detect air pressure exceeding the threshold value during the injection of the air into the injection hole.

DETAILED DESCRIPTION

Embodiments will be described with reference to the accompanying drawings.

A heat seal bar attachment device is used for a bag making apparatus. The bag making apparatus includes a heat seal device that heat-seals components of bags such as sheet panels and gussets. The heat seal device includes a heater and a pair of heat seal bars. The heat seal bar attachment device is incorporated into the heat seal device and configured such that an operator can detachably attach a heat seal bar to the heater.

Figure 1:
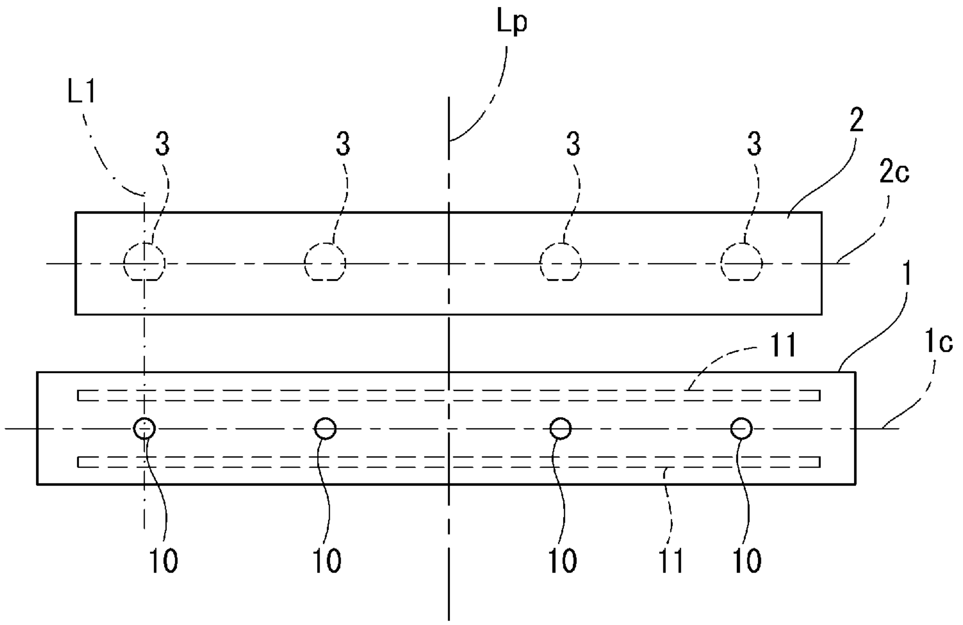
FIG. 1 illustrates an example heater and an example heat seal bar.

FIG. 1 illustrates an example heater 1 and an example heat seal bar 2 (hereinafter simply referred to as "bar").

The heater 1 has an elongated shape. The heater 1 has one or more through holes 10. For example, multiple (specifically four) through holes 10 are formed in the heater 1 to be arranged on the longitudinal centerline 1*c* of the heater 1. The heater 1 includes heat pipes 11 inside thereof. The heat pipes 11 transfer heat to substantially uniformly keep the interior of the heater 1 at a set temperature. For example, two heat pipes 11 are located on the both sides with respect to the through holes 10 to extend in the longitudinal direction of the heater 1.

The bar 2 has an elongated shape. One or more inserts 3 are fitted into the bar 2. For example, multiple (specifically four) inserts 3 are fitted into the bar 2 to be arranged on the longitudinal centerline 2*c* of the bar 2. Each insert 3 is inserted and fitted into an insertion recess 20 (FIG. 3) formed in one surface of the bar 2. The number and arrangement of inserts 3 (insertion recesses 20) correspond to the number and arrangement of through holes 10 in the heater 1. Therefore, the bar 2 being properly positioned in the heater 1 causes the through holes 10 in the heater 1 and the inserts 3 in the bar 2 to be aligned with each other (see Reference sign L1 in FIG. 1), which will be described below.

Figure 2A:
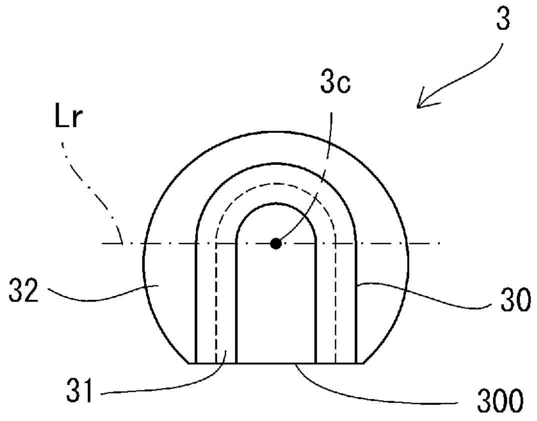
FIG. 2A to FIG. 2C illustrate a plan view, a cross-sectional view, and a front view of an example insert, respectively.
Figures 2B, 2C:
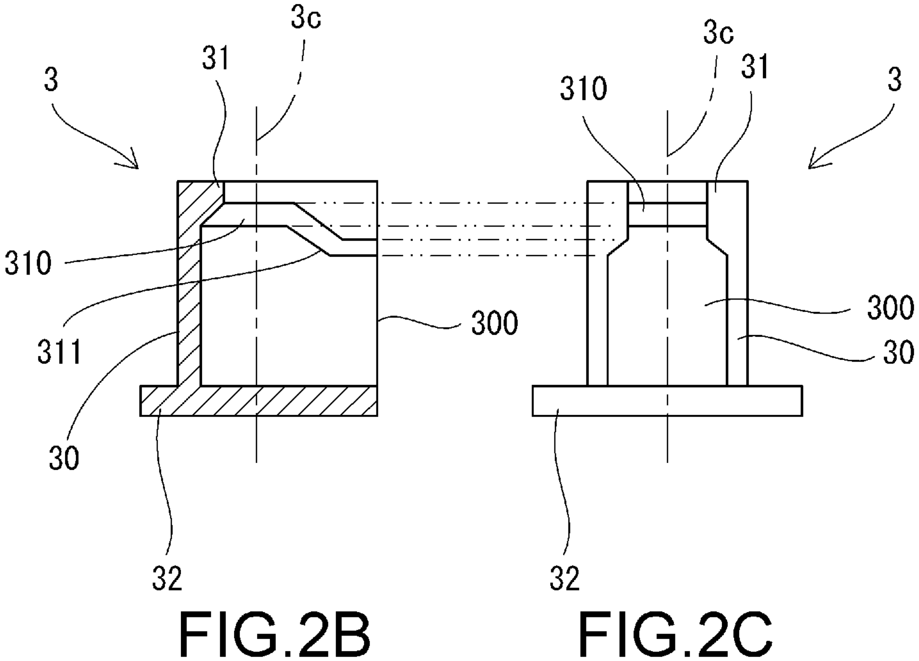

FIG. 2A to FIG. 2C are a plan view, a cross-sectional view, and a front view of an example insert 3, respectively. The insert 3 is configured to removably receive the attachment head 40 (FIG. 5) of the rod 4, which will be described below. The insert 3 in the embodiment has a receptacle 30, an inward protrusion 31, and a flange 32.

The receptacle 30 has an open first end (top end in FIG. 2B and FIG. 2C) and a closed second end (bottom end in FIG. 2B and FIG. 2C). The part of the side surface of the receptacle 30 is partially open so that the receptacle 30 has an insertion opening 300.

The inward protrusion 31 is located at the open end (first end side) of the receptacle 30 and extends inward from the inner surface of the receptacle 30. Thereby, the inward protrusion 31 defines a receiving surface 310 and a step 311 in the receptacle 30. The receiving surface 310 tapers towards the open end of the receptacle 30 in a conical trapezoidal manner with its apex at a predetermined point on the centerline 3*c* of the insert 3. Reference sign Lr in FIG. 2A designates a reference line, which passes through the centerline 3*c*, is perpendicular to this centerline and parallel to the insert 300.

The flange 32 is located at the closed end (second end) of the receptacle 30 and extends outward from the outer surface of the receptacle 30.

The bar 2 may be made of a relatively soft metal such as aluminum, brass, etc. The insert 3 may be made of a relatively hard metal, such as S45C. Thus, the insert 3 may be made of a harder metal than the bar 2. The insert 3 may be one piece or be constituted by an assemble of multiple parts.

Figure 3:
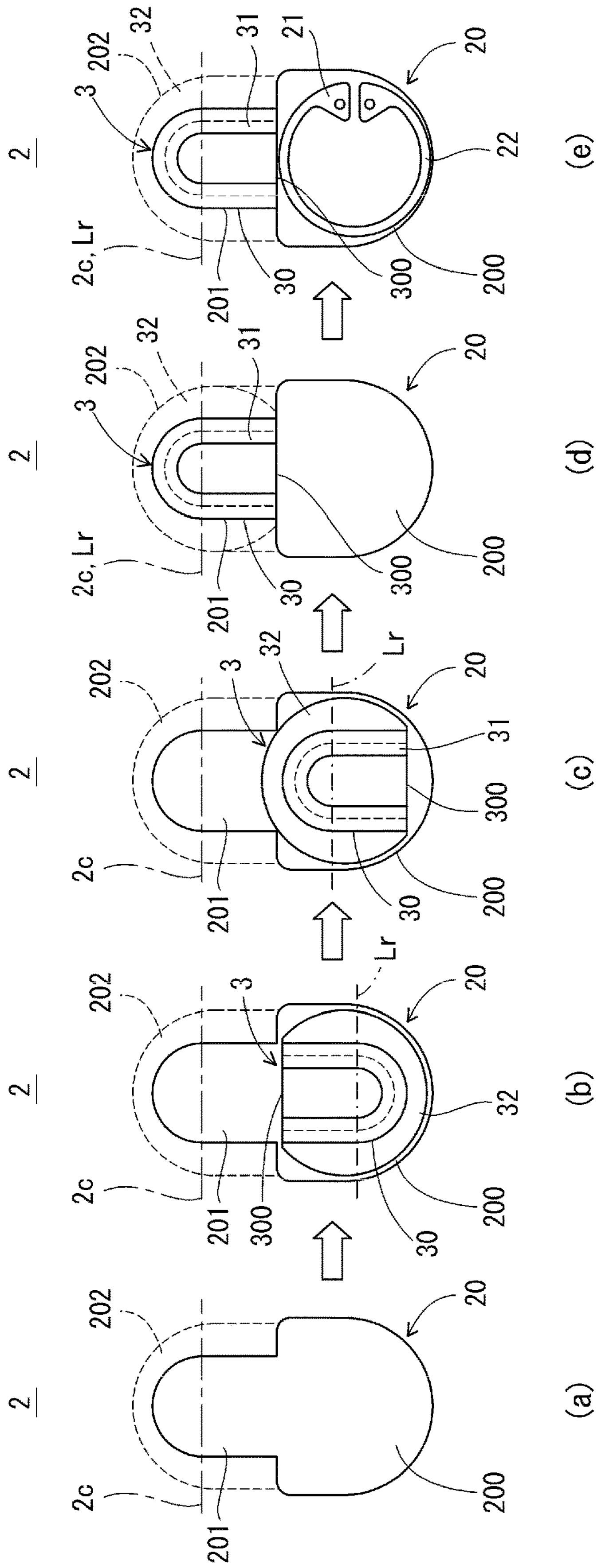
FIG. 3 illustrates fitting of an insert into a heat seal bar.

FIG. 3 illustrates fitting of the insert 3 into the bar 2. The bar 2 has an insertion recess 20 on one surface thereof into which the insert 3 is to be inserted. The insertion recess 20 has an insertion groove 200, an attachment groove 201 adjacent to the insertion groove 200, and a fitting groove 202 adjacent to the bottom of the attachment groove 201 (see (a) in FIG. 3).

An operator inserts the insert 3 into the insertion groove 200 so that its flange 32 faces the bottom surface of the insertion recess 20 (see (b) in FIG. 3). At this point, the insertion opening 300 of the insert 3 faces the attachment groove 201.

The operator then rotates the insert 3 by 180° (see (c) in FIG. 3).

The operator then slides the insert 3 into the attachment groove 201 (see (d) in FIG. 3). At this point, the receptacle 30 is guided along the attachment groove 201 by the attachment groove 201. When the insert 3 has moved to the end of the attachment groove 201, its flange 32 has been fitted into the fitting groove 202. In addition, the reference line Lr of the insert 3 has coincided with the longitudinal centerline 2*c* of the bar 2. The insertion opening 300 of the insert 3 faces the insertion groove 200.

The operator then places a fixture 21 (e.g., snap ring) in the insertion groove 200 (see (e) in FIG. 3). The fixture 21 secures the insert 3 to prevent the insert 3 from moving out of the attachment groove 201 and the fitting groove 202. Since the fitting groove 202 has a width greater than that of the fitting groove 201, the difference in width between the fitting groove 202 and the attachment groove 201 defines an engagement surface. When the insert 3 has moved to the end of the fitting groove 202, its flange 32 faces this engagement surface. This prevents the insert 3 from slipping out of the bar 2 (insertion recess 20). In this way, the insert 3 is fitted into the bar 2 and thus positioned.

Figure 4:
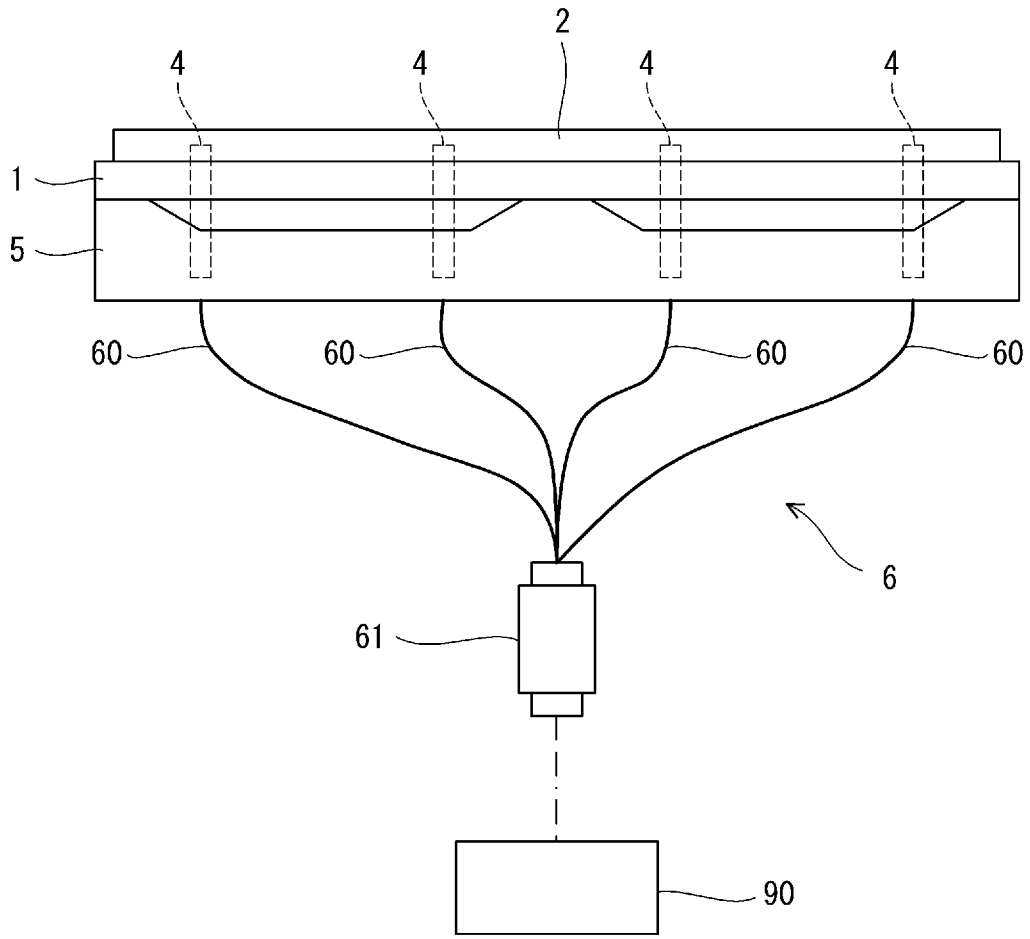
FIG. 4 schematically illustrates an example heat seal bar attachment device.

FIG. 4 schematically illustrates an example heat seal bar attachment device with the bar 2 attached to the heater 1. The heat seal bar attachment device includes one or more rods 4, a support 5, and a fluid supply unit 6.

For example, multiple (specifically four) rods 4 are provided. The rods 4 are inserted through the heater 1. That is, the rods 4 extend through the through holes 10 (FIG. 1) of the heater 1. Extra through holes 10 may be provided to commonly deal with the several types and parts of bars 2 and heaters 1. The number of rods 4, the number of through holes 10, and the number of inserts 3 are selected as appropriate.

The support 5 supports the heater 1. The heater 1 is fixedly attached to the support 5.

The fluid supply unit 6 is configured to move the rod 4 in its longitudinal direction with respect to the heater 1 for attaching and detaching the bar 2.

Figure 5:
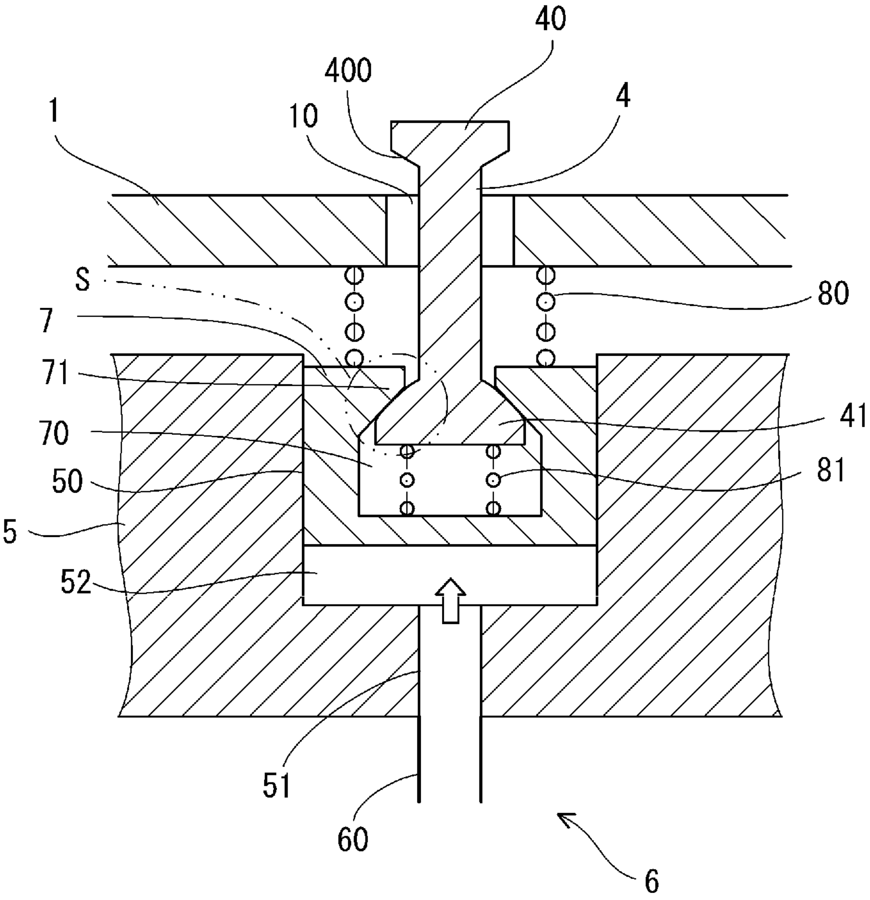
FIG. 5 schematically illustrates an attachment arrangement of the attachment device in FIG. 4.

FIG. 5 schematically illustrates the attachment arrangement of the attachment device. Each rod 4 has an attachment head 40 at its first end (top end in FIG. 4). The attachment head 40 is configured to be detachably attached to the insert 3 located in the bar 2. The attachment head 40 may be flange-shaped to extend in the radial direction of the rod 4, thereby defining an engagement surface 400. The attachment head 40 is located on the opposite side of the support 5 with respect to the heater 1. Each of the through holes 10 in the heater 1 is dimensioned to allow the attachment head 40 to pass through the heater 1.

The rod 4 includes a protrusion 41 at its second end (bottom end in FIG. 5). The protrusion 41 may extend in the radial direction of the rod 4 to have a flange shape. The protrusion 41 is located on the side of the support 5 with respect to the heater 1.

The rod 4 with the attachment head 40 and the protrusion 41 may be one piece. The rod 4 may be, for example, a bolt. Alternatively, the attachment head 40 and the protrusion 41 may be constituted by distinct components from the rod 4 and attached to the first and second ends of the rod 4, respectively.

The support 5 supporting the heater 1 has guide recesses 50 facing the heater 1. Each of the guide recesses 50 is formed in the surface of the support 5 which faces the heater 1. Flow channel holes 51 are formed in the support 5, and each of them is connected to a guide recess 50 at the bottom surface of the guide recess 50.

The heat seal bar attachment device further includes sliders 7, biasing members 80, and (additional) biasing members 81.

Each of the sliders 7 is received and accommodated in a guide recess 50 and configured to be slidable towards and away from the heater 1 in the guide recess 50. The outer circumference of the slider 7 contacts the inner circumference of the guide recess 50 without any gaps. This ensures some seal between the inner circumference of the guide recess 50 and the outer circumference of the slider 7 while the slider 7 slides within the guide recess 50. A space 52 is defined between the bottom surface of the guide recess 50 and the slider 7 by the guide recess 50 and the slider 7. The space 52 is in communication with the flow channel hole 51 in the support 5.

The slider 7 has a receiving recess 70 and a stopper 71. The receiving recess 70 is formed in the slider 7 to receive the second end of the rod 4 and thus the protrusion 41. The stopper 71 is formed on the opening of the receiving recess 70 and is an inwardly extending annular projection. The slider 7 may be made of one piece or may be constituted by an assembly of multiple parts.

Each of the biasing members 80 is disposed between the heater 1 and a slider 7 to bias the slider 7 towards a bottom surface of a guide recess 50 in the direction away from the heater 1 (downward in FIG. 5). The biasing member 80 may be a spring. The bar 2 is brought into close contact with the heater 1 to be fixed to it by this biasing force, as described below.

Each of the biasing members 81 is disposed in a receiving recess 70 between a bottom surface of a receiving recess 70 and an end surface of a protrusion 41 of a rod 4 to bias the protrusion 41 towards the heater 1 (upwardly in FIG. 5) for keeping the protrusion 41 engaged with a stopper 71. The protrusion 41 being engaged with the stopper 71 prevents the rod 4 from slipping out of the slider 7 and enables the rod 4 to move together with the slider 7. The biasing member 81 may be a spring.

Figure 6:
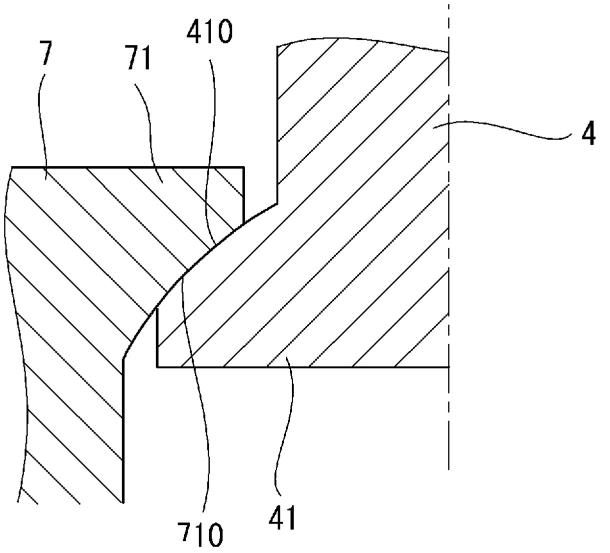
FIG. 6 is an enlarged view of an area S in FIG. 5.

FIG. 6 illustrates an enlarged view of the region S in FIG. 5. The flange-shaped protrusion 41 has a convex spherical surface 410. The annular-shaped stopper 71 has a concave spherical surface 710 that is complementary to the convex spherical surface 410. When the protrusion 41 is engaged with the stopper 71 by the biasing member 81 as illustrated in FIG. 5, the convex spherical surface 410 and the concave spherical surface 710 are in surface contact with each other.

As illustrated in FIG. 4 and FIG. 5, the fluid supply unit 6 includes tubes 60 and a fluid supplier 61 (visible in FIG. 4 only). The tubes 60 are connected at the first end thereof to the channel holes 51 of the support 5, respectively. Thereby, the fluid supply unit 6 is in fluid communication with each channel hole 51 and each space 52. The tubes 60 are connected at the second end thereof to the fluid supplier 61. The fluid supplier 61, when activated, supplies fluid to the guide recesses 50 (spaces 52) through the tubes 60 and the flow channel holes 51.

The fluid supplier 61 may be, for example, a fluid cylinder connected via a valve to the second end of each tube 60 for the supply of fluid. Multiple fluid suppliers 61, that is, multiple fluid cylinders may be provided. The fluid cylinder may be air cylinder. The fluid supplier 61 may have another configuration such as a fluid pump (e.g., air pump), not limited to the fluid cylinder. The fluid may be other fluids, not limited to air. The fluid may be gas or liquid.

As illustrated in FIG. 4, the heat seal bar attachment device further includes a user interface 90. The user interface 90 is operation means to be operated by an operator, such as a button, switch, touch screen, etc. The user interface 90 may be provided on the fluid supply unit 6 or other components in the bag making apparatus, for example, on the operation panel section. The fluid supply unit 6 is configured to switch the supply of the fluid to the guide recess 50 and the stop of this supply in response to an input through the user interface 90.

For example, the fluid supply unit 6, in response to receiving an actuation signal from the user interface 90, supplies the fluid to the guide recesses 50 (spaces 52) through the tubes 60 and the channel holes 51, for example, by controlling the opening and closing of the valve to activate the fluid cylinder serving as the fluid supplier 61. The fluid supply unit 6, in response to receiving a stop signal from the user interface 90, stops supplying the fluid, for example, by controlling the opening and closing of the valve to deactivate the fluid cylinder serving as the fluid supplier 61. The spaces 52 are formed such that a certain degree of seal is maintained while the fluid is supplied.

Figure 7:
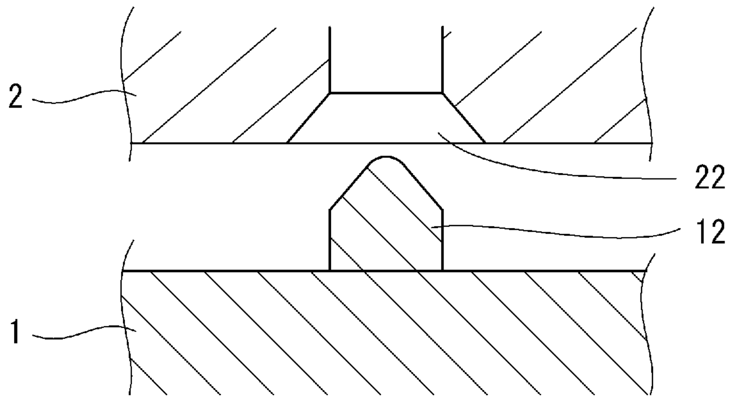
FIG. 7 partially illustrates the heater and the heat seal bar in FIG. 1.

FIG. 7 schematically illustrates the configuration of the heater 1 and the bar 2 near the positioning line Lp (FIG. 1). A guide pin 12 may be provided in the heater 1, for example by embedment. A hole 22 may be formed in the bar 2 to receive a guide pin 12 for positioning. The guide pin 12 may have a taper tip. The hole 22 may be chamfered. Multiple (e.g., two) guide pins may be provided, which may be located near both longitudinal sides of the bar 2 in FIG. 1.

Figure 8C:
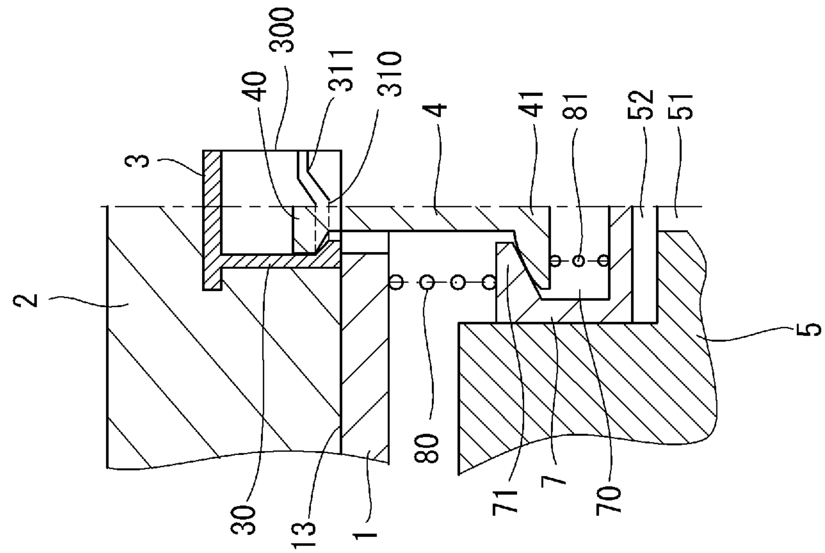
FIG. 8A to FIG. 8C illustrate an example attachment of a heat seal bar to a heater.
Figure 8B:
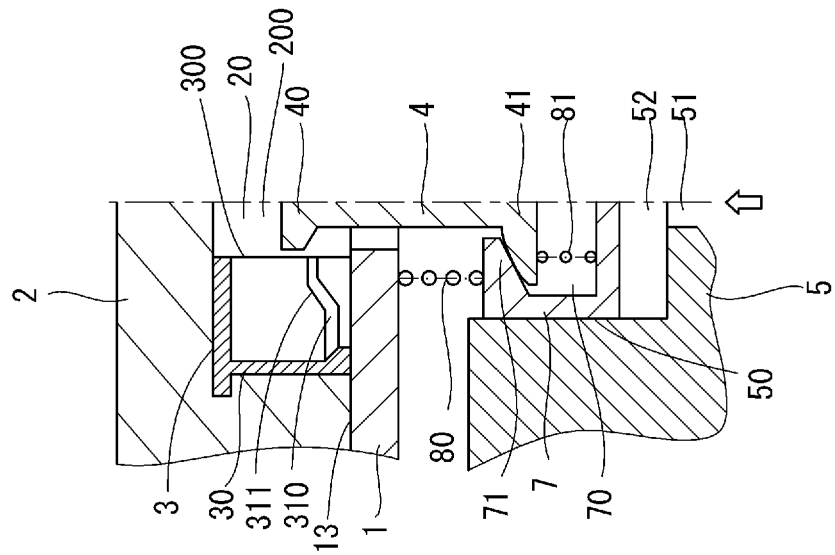
Figure 8A:
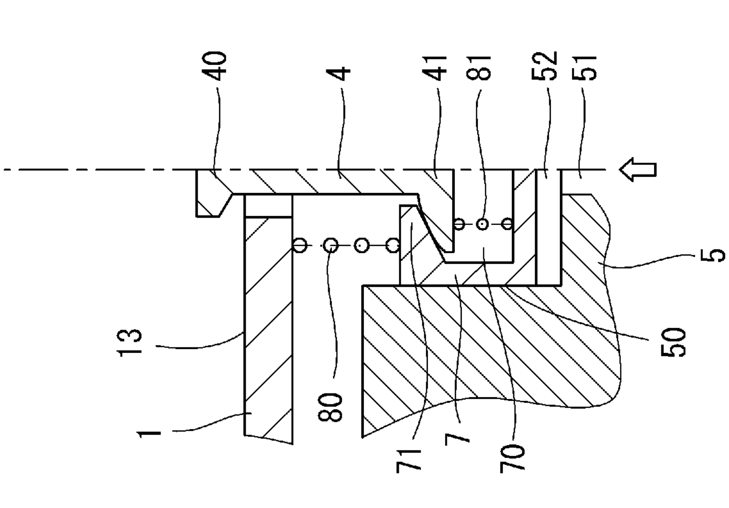

Referring to FIG. 8A to FIG. 8C, an example method of attaching the bar 2 to the heater 1 will be described. First, an operator operates the user interface 90 (FIG. 4) to have the fluid supply unit 6 (FIG. 4) supply the fluid to the guide recess(es) 50 (space (e) 52) through the channel hole(s) 51. This causes the slider(s) 7 to slide along the guide recess 50 towards the heater 1 (upward in FIG. 8A), against the biasing member 80 (its biasing force). The rod 4 moves together with the slider 7 due to the close contact with the slider 7 by the biasing member 81 (see FIGS. 8A and 8B). As a result, the attachment head 40 moves further away from the first surface 13 (the surface that the bar 2 will contact) (FIG. 8A, FIG. 8B) of the heater 1. In other words, the protrusion amount of the attachment head 40 from the first surface 13 increases.

The operator then handles and moves the bar 2 with the insert 3 inserted therein to place the projecting attachment head 40 into the insertion groove 200 of the insertion recess 20 (FIG. 8B). The operator then slides the bar 2 slightly with respect to the heater 1 (in the right direction in FIG. 8B, in the horizontal direction perpendicular to the longitudinal centerline 2*c* of the bar 2) to place the attachment head 40 in the receptacle 30 of the insert 3 through the insertion opening 300. At this point, the bar 2 is guided by the guide pin 12 (FIG. 7) and is almost positioned with respect to the heater 1. Furthermore, the attachment head 40 can get over the step 311 in the insert 3 due to its increased protrusion amount described above. The operator spacing the bar 2 slightly from the heater I will cause the rod 4 to be naturally guided to be aligned with the reference line Lr (FIG. 3), even if it deviates from the position of the reference line Lr.

Figure 9:
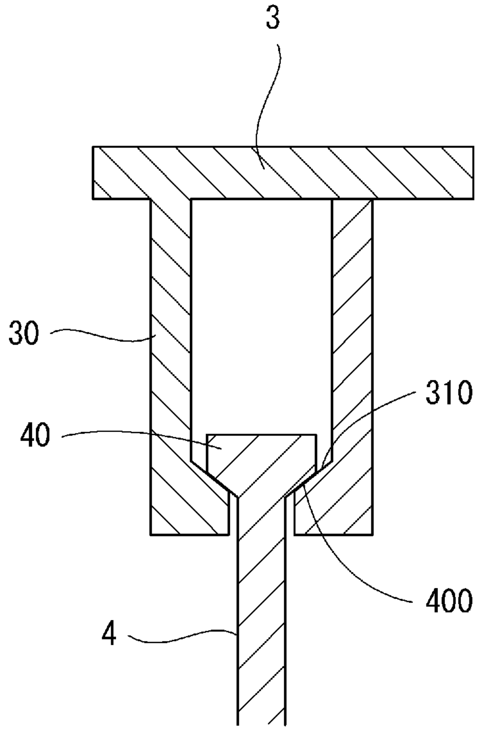
FIG. 9 illustrates a positional relationship between an insert and a rod.

Next, the operator operates the user interface 90 to have the fluid supply unit 6 stop supplying the fluid. The slider 7 (which was moved towards the heater 1 by the fluid supply) is then moved towards the bottom surface of the guide recess 50 together with the rod 4 by the biasing member 80 (FIG. 8C). Thereby, the attachment head 40 is brought into close contact with the insert 3 in it to be attached to it. Specifically, as best illustrated in FIG. 9, the engagement surface 400 of the attachment head 40 is engaged closely with the receiving surface 310 of the insert 3. As a result, the bar 2 is in close contact with the first surface 13 of the heater 1 and is positioned with respect to the heater 1. In this way, the attachment of the bar 2 to the heater 1 is completed. When the heater 1 generates heat, the bar 2 is heated by heat conduction from the heater 1.

The above procedures only have to be implemented reversely to detach the bar 2 from the heater 1.

In this way, the operator can detachably attach the bar 2 to the heater 1 only through the simple operation of the user interface 90. Thus, the operator can, for example, replace the bar 2 with one having a different sealing surface shape on the heater 1, and can address change in the shape of the bar 2 in accordance with change in the design of the bags to be made.

Figure 10A:
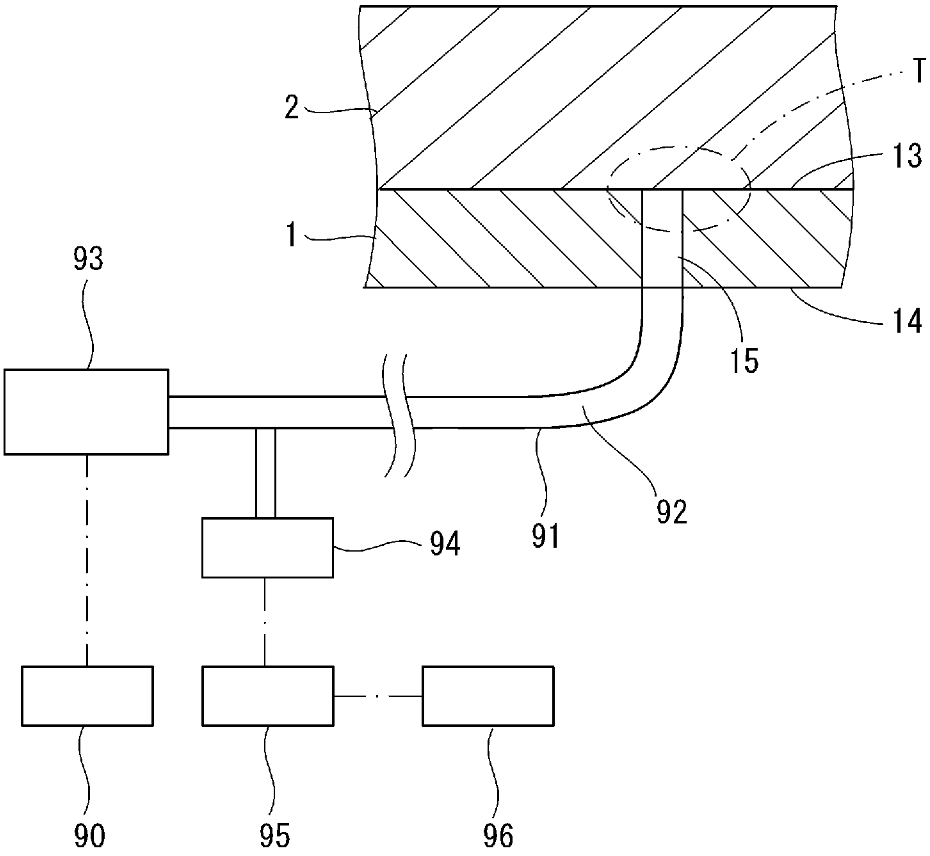
FIG. 10A illustrates a configuration for checking attachment of a heat seal bar.

As described above, the heat seal bar attachment device is configured to bring the bar 2 into close contact with the first surface 13 when the bar 2 is attached to the heater 1. The heat seal bar attachment device may have a configuration to determine whether or not the bar 2 is in close contact with the first surface 13 of the heater 1. FIG. 10A schematically illustrates this configuration. The heater 1 has an injection hole 15. The injection hole 15 is formed in the heater 1 as a through hole distinct from the through holes 10 (FIG. 1, etc.) for the rods 4. The injection hole 15 extends between the first surface 13 and the opposite second surface 14.

The heat seal bar attachment device has a tubular member 91 which defines a flow channel 92 therein which is in commutation with the injection hole 15 at the second surface 14, and an air injector 93 that injects air into the injection hole 15 through the flow channel 92. The tubular member 91 may be an additional tube prepared separately from the tubes 60. The tubular member 91 has a first end connected to the injection hole 15 at the second surface 14, and a second end connected to the air injector 93. As in the fluid supplier 61, the air injector 93 is an air supply device that supplies compressed air and may be a known air supply device including, for example, a compressor, regulator, air cylinder, or the like.

The heat seal bar attachment device further includes a pressure sensor 94 for detecting air pressure in the flow channel 92. The pressure sensor 94 may be, for example, an air gauge connected to the middle section of the tubular member 91 to pneumatically communicate with the flow channel 92 so that it can detect air pressure in the flow channel 92 over time.

The heat seal bar attachment device further includes a determination part 95 configured to determine whether or not the bar 2 is in close contact with the first surface 13 based on the air pressure detected by the pressure sensor 94. The determination part 95 may be implemented, for example, by a processor executing a program stored in a storage medium.

FIG. 10A illustrates the bar 2 properly attached to the heater 1. The bar 2 is in close contact with the first surface 13 and blocks one end of the injection hole 15. Therefore, when the air injector 93 injects air into the injection hole 15 through the flow channel 92 with the bar 2 being in close contact with the first surface 13, the air fails to flow out of the injection hole 15. Consequently, the pressure in the flow channel 92 significantly increases. The pressure sensor 94 detects this significant increase in air pressure.

Figure 10B:
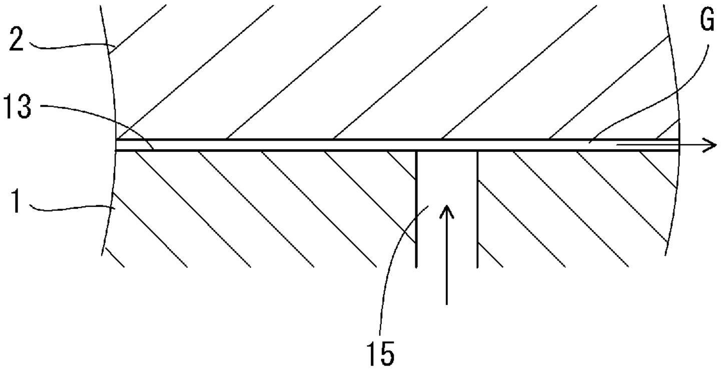
FIG. 10B is an enlarged view of an area T in FIG. 10A.

FIG. 10B is an enlarged view of the area T in FIG. 10A, illustrating the bar 2 improperly attached to the heater 1. The bar 2 is not in close contact with the first surface 13, and thus, fails to block one end of the injection hole 15, so that a gap G is formed between the bar 2 and the heater 1. Therefore, when the air injector 93 injects air into the injection hole 15 through the flow channel 92 without the bar 2 being in close contact with the first surface 13, the air flows out of the injection hole 15 to leak into the gap G (see the arrows indicating air flow in FIG. 10B). Consequently, the air pressure in the flow channel 92 does not increase. Instead, even if the air pressure in the flow channel 92 increases, it does not increase as much as when the bar 2 is in close contact with the first surface 13. The pressure sensor 94 does not detect significant increase in air pressure.

In other words, the change (increase) in air pressure in the flow channel 92 during the air injection is different between when bar 2 is in close contact with the first surface 13 and when it is not. By using this, it is possible to check whether or not the bar 2 is in close contact with the first surface 13, in other words, whether or not the bar 2 is properly attached to the heater 1.

Therefore, when the pressure sensor 94 detects air pressure exceeding a threshold value (predetermined pressure value) during the injection of the air into the injection hole 15 by the air injector 93, the determination part 95 determines that the bar 2 is in close contact with the first surface 13 (there is no fault of the attachment of the bar 2). On the other hand, if the pressure sensor 94 does not detect air pressure exceeding the above threshold value during the injection of the air into the injection hole 15 by the air injector 93, the determination part 95 determines that the bar 2 is not in close contact with the heater 1 (there is fault of the attachment of the bar 2). The threshold value is set in advance according to the heater 1, the rods 4, and the biasing members 80, 81, etc. to be used and/or through a prior confirmation test.

The air injector 93 may be configured to automatically inject air, for example, at a time such as after the bar 2 is attached to the heater 1 and/or when the bag making apparatus (heat seal device) starts its operation. Additionally and/or alternately, the air injector 93 may be configured to inject air in response to manual operation by an operator, such as an input through the user interface 90 (FIG. 10A) by the operator. In this manner, the air injector 93 does not inject air except when checking for close contact, instead of continuously injecting air all the time.

The processor which constitutes the determination part 95 may be configured to send an operation stop signal to the bag making apparatus/heat seal device if the pressure sensor 94 does not detect air pressure exceeding the threshold value (if there is fault of the attachment of the bar 2). The bag making apparatus/heat seal device may be configured to stop its operation upon receipt of the operation stop signal. In addition to/instead of this, the processor may cause the warning device 96 (FIG. 10A) to output a warning when there is fault of the attachment of the bar 2. The warning device 96 is a visual device (e.g., LED or display) or an audio device (e.g., speaker), and the output of the warning may be lighting or flashing of an LED, indication of warning on a display, or generation of warning tone from a speaker.

As is clear from the above description, the embodiment enables the rod 4 with the attachment head 40 to be moved with respect to the heater 1 in the longitudinal direction of the rod 4 by means of the novel configuration utilizing the supply of the fluid and the stop of the supply achieved by the fluid supply unit 6 as well as the biasing force of the biasing member 80.

The embodiment switches the supply of the fluid and the stop of the supply in response to the input(s) through the user interface 90, allowing for one-touch attachment and removal of the bar 2.

Unlike the prior art, the embodiment eliminates the need for the rod 4 to penetrate through the support 5. This increases flexibility in spatial arrangement, for example, this allows for the configuration in which the tubes 60, which communicate with the spaces 52, are placed on the side surface of the support 5. Furthermore, the embodiment constitutes a fluid supply unit 6 with the tubes 60 and the fluid supplier 61. These allows the fluid supply unit 6 to be configured such that it does not occupy so much the space closer to the support 5 (the space below the support 5 in FIG. 5). Furthermore, the embodiment also eliminates the need for the user interface 90 to be located in the space closer to the support 5, and the user interface 90 only has to be placed in a position that is easy for an operator to operate. Thus, the embodiment enables one-touch attachment/removal of the bar 2 in a space-saving manner.

Where the heat seal bar attachment device illustrated in Patent document 1 is used for the lower bar of the upper and lower bar pair, an operator needs to enter under the bag making apparatus so as to access the operating mechanism for moving the tension pin (rod). The embodiment, on the other hand, eliminates this need due to the advantages described above. Thus, the embodiment is not only effective for attaching and detaching the upper bar, but also suitable for attaching and detaching the lower bar.

The surface contact between the convex spherical surface 410 of the flange-shaped protrusion 41 and the concave spherical surface 710 of the annular-shaped stopper 71 in FIG. 6 is maintained even when the rod 4 tilts slightly. In other words, this surface contact permits slight tilt of the rod 4. This is advantageous in that, for example, if the insert 3 is misaligned with respect to the bar 2 within the insertion recess 20, the rod 4 can slightly tilt to correct this misalignment. Such misalignment of the insert 3 can be caused, for example, by the difference in the coefficient of linear expansion between the support 5 and the bar 2 during heat generation by the heater 1.

The heat seal bar attachment device in the present disclosure may be incorporated into any heater unit for use in a bag making apparatus, such as a longitudinal heat seal device or cross heat seal device, regardless of its vertical position and the feed direction of a sheet panel. The heat seal bar attachment device may be used for attaching and detaching not only to the lower bar of the upper and lower bar pair, but also to the upper bar. The bar pair typically consists of a bar that is moved by an actuation mechanism and a stationary bar (for example, a rubber stage also belongs to this category) on the receiving side. The heat seal bar attachment device may be used for attaching and detaching either type of bar.

For the insertion recess 20 of the bar 2 in FIG. 3, the insertion groove 200 is located adjacent to the attachment groove 201 and away from the longitudinal centerline 2*c*. Therefore, an operator slides the bar 2 in the direction perpendicular to the centerline 2*c* with respect to the heater 1 when attaching the bar 2. For example, the insertion groove 200 may be located on the centerline 2*c*, as in the example disclosed in Patent document 1. In other words, the bar 2 may be configured such that an operator slides the bar 2 in the direction parallel to the centerline 2*c* with respect to the heater 1 when attaching the bar 2. The slide direction is not limited to these directions, as long as the bar 2 is configured in such a manner that the bar 2 is eventually positioned at the design center position with respect to the heater 1.

Since an operator cannot see the insert(s) 3 or the rod(s) 4 when attaching the bar 2, the guide pin 12 in FIG. 7 serves as a marker for positioning. Any markers for positioning may be provided on the heater 1 and the bar 2 by means of such as engraving.

The means for checking for fault of the attachment of the bar 2 prevents the heat seal device/bag making apparatus from operating with the bar 2 improperly attached to the heater 1.

Technically speaking, the close contact of the bar 2 with the first surface 13 is not uniform, since the bar 2 in the embodiment is closely attached to the heater 1 via the multiple rods 4 (see FIG. 4). The close contact at a position near the rod 4 is stronger than that at a position away from the rod 4.

Where the flatness of the contact surface(s) of the bar 2 and/or the heater 1 is low: For the injection hole 15 formed away from the rod 4, some air leakage may occur even if the bar 2 is properly attached to the heater 1. When the threshold is not set accurately, false detection of fault of the attachment may occur. For the injection hole 15 located near the rod 4, such a problem cannot occur.

Where the flatness of the contact surface(s) of the bar 2 and/or the heater 1 is high: The bar 2 will be in uniform and close contact with the first surface 13 if the bar 2 is properly attached to the heater 1. Any location of the injection hole 15 cannot cause air leakage problems as long as the bar 2 is properly attached.

Thus, the position and number of injection holes 15 should be determined, considering the number and location of rods 4, the flatness of the contact surfaces, etc. For example, multiple injection holes 15 may be provided, some of which may be formed near the rod 4 and the rest of which may be formed away from the rod 4.

Where multiple injection holes 15 are formed, the same number of tubular members 91, air injectors 93 and pressure sensors 94 may be provided as the injection holes 15.

Alternatively, only one tubular member 91, one air injector 93 and one pressure sensor 94 may be provided. For this case, the tubular member 91 is a branch tube connected to the air injector 93 and each of the injection holes 15. Thus, its flow channel 92 consists of a main channel that communicates with the air injector 93 and distribution channels that branch off from the main channel and communicate with the injection holes 15, respectively. The air injector 93 injects air into all the injection holes 15 simultaneously through the flow channel 92 (the main channel and each distribution channel).

Where injection holes 15 each have a smaller diameter, a small air injector 93 can be used.

The invention claimed is:

1. A heat seal bar attachment device for use in a bag making apparatus and for detachably attaching a heat seal bar to a heater, the heat seal bar attachment device comprising:

a rod inserted through the heater and having a first end and a second end opposite to the first end, the rod comprising an attachment head at the first end thereof, the attachment head being configured to be detachably attached to an insert fitted into the heat seal bar;

a support for supporting the heater, the support having a guide recess facing the heater and a flow channel hole in direct fluid communication with the guide recess;

a slider having a receiving recess for receiving a second end of the rod therein, the slider being received in the guide recess to be slidable together with the rod towards and away from the heater;

a biasing member spring disposed between the heater and the slider to bias the slider towards a bottom surface of the guide recess; and a fluid supply unit configured to comprise a fluid supplier fluidly connected to the flow channel hole to supply fluid through the flow channel hole to the guide recess and stop supplying the fluid, wherein the fluid supply unit is configured to supply the fluid to the guide recess to slide the slider together with the rod against the biasing member spring towards the heater.

2. The heat seal bar attachment device of claim 1, wherein the rod has a protrusion at the second end, the protrusion extending in a radial direction of the rod, wherein the slider comprises a stopper at an opening of the receiving recess, and wherein the heat seal bar attachment device further comprises an additional biasing member spring disposed in the receiving recess to bias the protrusion for engaging the protrusion with the stopper.

3. The heat seal bar attachment device of claim 2, wherein the protrusion is flange-shaped and has a convex spherical surface, wherein the stopper is annular-shaped and has a concave spherical surface complementary to the convex spherical surface, and wherein the convex spherical surface and the concave spherical surface are in surface contact with each other when the protrusion is engaged with the stopper by the additional biasing member spring.

4. The heat seal bar attachment device of claim 1, wherein the flow channel hole is formed in the support to be in communication with the guide recess at the bottom surface of the guide recess, and wherein the fluid supply unit is configured to supply the fluid to the guide recess through the flow channel hole.

5. The heat seal bar attachment device of claim 1, wherein the fluid supply unit comprises a tube connected to the flow channel hole and the fluid supplier, and wherein the fluid supplier connected to the tube is configured to supply the fluid to the guide recess through the tube and the flow channel hole.

6. The heat seal bar attachment device of claim 1, wherein the fluid supplier is an air cylinder configured to supply air as the fluid.

7. The heat seal bar attachment device of claim 1, further comprising a user interface, wherein the fluid supply unit is configured to switch supply of the fluid and stop of the supply in response to an input through the user interface.

8. The heat seal bar attachment device of claim 1, wherein the heat seal bar attachment device is configured to bring the heat seal bar into close contact with a first surface of the heater when the heat seal bar is attached to the heater, the heater having an injection hole as a through hole extending between the first surface and a second surface different from the first surface, wherein the heat seal bar attachment device further comprises:

a tubular member defining a flow channel which is in communication with the injection hole at the second surface;

an air injector configured to inject air through the flow channel into the injection hole;

a pressure sensor for detecting air pressure in the flow channel; and a determination part processor configured to determine whether or not the heat seal bar is in close contact with the first surface based on the air pressure measured by the pressure sensor.

9. The heat seal bar attachment device of claim 8, wherein the determination part processor is configured to determine:

that the heat seal bar is in close contact with the heater, when the pressure sensor detects pressure exceeding a threshold value during injection of the air into the injection hole; and that the heat seal bar is not in close contact with the heater, when the pressure sensor does not detect air pressure exceeding the threshold value during the injection of the air into the injection hole.

10. A heat seal bar attachment device for use in a bag making apparatus and for detachably attaching a heat seal bar to a heater, the heat seal bar attachment device comprising:

a rod inserted through the heater and having a first end and a second end opposite to the first end, the rod comprising an attachment head at the first end, the attachment head being configured to be detachably attached to an insert fitted into the heat seal bar;

a support for supporting the heater, the support having a guide recess facing the heater and a flow channel hole in direct fluid communication with the guide recess;

a slider having a receiving recess for receiving a second end of the rod therein, the slider being received in the guide recess to be slidable together with the rod towards and away from the heater;

a spring disposed between the heater and the slider to bias the slider towards a bottom surface of the guide recess; and a fluid supply unit comprising a fluid supplier leak-tightly connected to the flow channel hole to supply fluid through the flow channel hole to the guide recess to slide the slider together with the rod against the spring towards the heater.

11. A heat seal bar attachment device for use in a bag making apparatus and for detachably attaching a heat seal bar to a heater, the heat seal bar attachment device comprising:

a rod inserted through the heater and having a first end and a second end opposite to the first end, the rod comprising an attachment head at the first end, the attachment head being configured to be detachably attached to an insert fitted into the heat seal bar;

a support for supporting the heater, the support having a guide recess facing the heater and a flow channel hole in direct fluid communication with the guide recess;

a slider having a receiving recess for receiving a second end of the rod therein, the slider being received in the guide recess to be slidable together with the rod towards and away from the heater;

a biasing member disposed between the heater and the slider to bias the slider towards a bottom surface of the guide recess; and a fluid supply unit configured to supply fluid through the flow channel hole to the guide recess to slide the slider together with the rod against the biasing member towards the heater.

* * * * *